Feb. 7, 1928.

R. H. GOLDMAN

MANICURING INSTRUMENT

Original Filed June 15, 1925

Re. 16,869

Inventor:
Ralph H. Goldman
By Frank C. Curtis
Attorney

Reissued Feb. 7, 1928. Re. 16,869

UNITED STATES PATENT OFFICE.

RALPH H. GOLDMAN, OF NEW YORK, N. Y., ASSIGNOR TO HENRY L. HUGHES CO. INC., A CORPORATION OF NEW YORK.

MANICURING INSTRUMENT.

Original No. 1,589,339, dated June 15, 1926, Serial No. 37,080, filed June 15, 1925. Application for reissue filed December 10, 1927. Serial No. 239,243.

Reference may be had to the accompanying drawings, and the reference characters marked thereon, which form a part of this specification. Similar characters refer to similar parts in the several figures therein.

The principal object of the invention is to provide a manicure instrument which can be safely used for pushing back the cuticle around the nails and for abrading and scraping and brushing away particles of dry cuticle as well as for removing extraneous matter from beneath the nails.

Other objects will appear in connection with the following description:

Figure 1 of the drawings is a view in side elevation of a manicuring instrument embodying my invention.

Figures 1, 2 and 3 are drawn on an enlarged scale.

Figure 1:
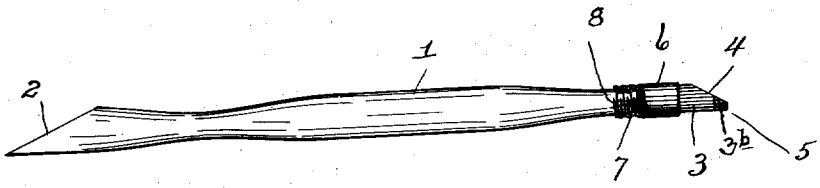
Figure 2:
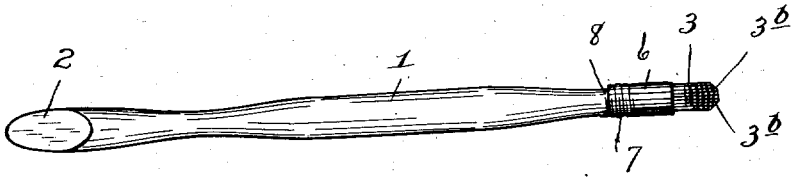
Figure 2 is a top plan view of the same as shown in Fig. 1.

Referring to the drawings wherein the invention is shown in preferred form, my improved manicuring instrument comprises a shaft or handle 1, terminating at one end in a tapered cuticle-pusher, 2, similar to the tapered end of an orangewood stick such as is commonly used for pushing back the cuticle around the nails and for removing extraneous matter from beneath the nails and the crevices between the sides of the nails and the cuticle.

The stick or shaft, 1, may be made of wood, celluloid or other material of which cuticle-pushers are ordinarily made.

The shaft, 1, has upon its other end a compact body, 3, of stubby bristles terminating in wedge-form as at 4, and preferably of a size and form adapted to enter between the top of the nails and the neighboring cuticle on the fingers.

By "stubby bristles" I mean short thick bristles which are semi-rigid so that they will not readily bend or yield laterally and may be used in place of a solid body to push back the cuticle in somewhat the manner as, but with less danger of injury to the nail and cuticle than a cuticle-pusher made of orangewood or other solid or rigid material.

The wedge-shape form of the bristles 3, enables the end of the knot or bunch of bristles to enter between the cuticle along the top of the nail and slightly raise the same without injury to either the nail or the cuticle.

The cut ends of the individual stubby bristles present abrading edges which serve to abrade and wear away portions of dry cuticle while the body of bristles serves to remove and brush away the abraded particles.

In forming the wedge shaped end on the body of bristles, I prefer to first trim the body of bristles to general beveled form, and thereafter to perpendicularly trim the outer end of the body of bristles so that the longest bristles shall have perpendicularly cut ends as shown in Fig. 1.

The body of bristles, 3, may be mounted upon the shaft, 1, in any known manner.

I prefer however to make the body of bristles readily detachable from the shaft, and for this purpose I have shown the bristles mounted in a ferrule, 6, having a screw-threaded socket, 7, adapted to detachably engage a similarly screw-threaded end, 8, on the shaft.

By this or an equivalent construction, the body of bristles can be readily detached from the shaft and replaced by another body of bristles of the same or somewhat different character, in adapting the brush to the intended purpose.

The bristles may be secured within the ferrule, 6, in any known manner.

Figure 3:
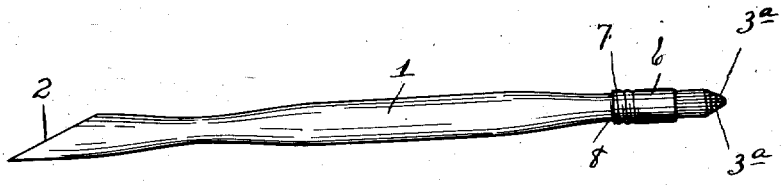
Fig. 3 is a view in side elevation of a broken-away portion of a manicuring instrument embodying my invention in another form.
Figure 4:
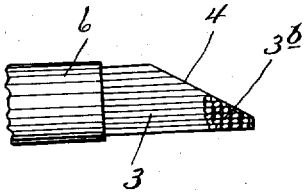
Figure 4 is a view similar to Fig. 1 on a still larger scale showing the broken-away bristle-end of the device.

In Fig. 1, I have shown the body of bristles of simple wedge-form, but if desired the body of bristles may be of double-wedge or V-form as shown at $3^a$ in Fig. 3.

A brush of the character described will be found to have many uses. It may be used for removal of extraneous matter from between the teeth; removal of soft tartar from the teeth, and removal of pus from sores or wounds etc. In general a brush having the described characteristics may be used wherever a gentle, abrading, scraping or pushing action is desired.

In the preferred form of brush shown in the drawings, the body of bristles is perpendicularly trimmed to oblique truncated form at the corners as shown at $3^b$, forming thereat vertical walls composed of the cut ends of the bristles which are well adapted to form an abrading axis.

The ends of the body of bristles are thus made of tapered form as viewed from either the side or the top, and thus combines the advantages of a wedge-shaped body with the advantages of flat abrasive surfaces whereby the brush is adapted for the above stated uses.

I do not wish to be limited to the constructions shown and above described, as for certain purposes of the invention, various changes may be made in the form and arrangement of various parts of the device without departing from the spirit of the invention.

What I claim as new and desire to secure as Letters Patent is:—

1. A device of the class described including a shaft having at one end a compact body of stubby bristles terminating in wedge-form.

2. A device of the class described including a shaft having at one end a compact body of stubby bristles with abrading ends terminating in general wedge-form.

3. A device of the class described including a shaft terminating at one end in a tapered cuticle pusher and having at its other end a compact body of bristles terminating in general wedge-form.

4. A device of the class described including a shaft having at one end a compact body of stubby bristles terminating in wedge-form, with the longest bristles presenting perpendicularly cut ends.

5. A device of the class described comprising a manicure stick terminating at one end in a tapered cuticle pusher, and in readily detachable connection with the other end of said stick a compact body of stubby bristles in wedge-form, said tapered cuticle pusher and said body of bristles being adapted to be used while interconnected.

6. A device of the class described including a shaft having at one end a compact body of stubby bristles terminating in wedge-form with obliquely truncated corners.

7. A device of the class described including a shaft having at one end a compact body of stubby bristles tapered to a horizontal edge and having at one end of said edge a vertical abrading surface formed by cut ends of the bristles.

8. A manicuring instrument including a shaft having at one end a compact body of stubby bristles terminating in a relatively thin compact end providing a substantially unyielding bristle cuticle pusher.

9. A manicuring instrument including a shaft having at one end a compact body of stubby bristles terminating in a relatively flattened compact end providing a substantially unyielding bristle cuticle pusher.

10. A manicuring instrument including a shaft having at one end a compact body of stubby bristles terminating in a relatively flattened compact end providing a substantially unyielding bristle cuticle pusher, said end being relatively thin whereby to fit bodily beneath a finger nail.

11. A manicuring instrument including a shaft having at one end a compact body of stubby bristles terminating in a relatively flattened compact end providing a substantially unyielding bristle cuticle pusher, said end being relatively thin whereby to fit bodily beneath a finger nail, and the body having a transverse abrading surface formed by obliquely cut ends of the bristles.

In testimony whereof, I have hereunto set my hand this 9th day of December, 1927.

RALPH H. GOLDMAN.